US009268611B2

(12) United States Patent
Iyer et al.

(10) Patent No.: US 9,268,611 B2
(45) Date of Patent: Feb. 23, 2016

(54) APPLICATION SCHEDULING IN HETEROGENEOUS MULTIPROCESSOR COMPUTING PLATFORM BASED ON A RATIO OF PREDICTED PERFORMANCE OF PROCESSOR CORES

(75) Inventors: Ravishankar Iyer, Portland, OR (US); Sadagopan Srinivasan, Hillsboro, OR (US); Li Zhao, Beaverton, OR (US); Rameshkumar G. Illikkal, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 345 days.

(21) Appl. No.: 12/890,653

(22) Filed: Sep. 25, 2010

(65) Prior Publication Data
US 2012/0079235 A1 Mar. 29, 2012

(51) Int. Cl.
*G06F 9/50* (2006.01)
*G06F 11/34* (2006.01)
*G06F 12/08* (2006.01)

(52) U.S. Cl.
CPC .......... *G06F 9/5027* (2013.01); *G06F 11/3433* (2013.01); *G06F 12/084* (2013.01); *G06F 11/3409* (2013.01); *G06F 2201/88* (2013.01); *Y02B 60/142* (2013.01); *Y02B 60/165* (2013.01)

(58) Field of Classification Search
USPC ........................ 718/1–105, 108; 713/300–340
See application file for complete search history.

(56) References Cited

U.S. PATENT DOCUMENTS

| 5,898,870 A | 4/1999 | Okuda et al. |
| 5,930,511 A | 7/1999 | Hinsley |
| 6,021,076 A | 2/2000 | Woo et al. |
| 6,134,675 A | 10/2000 | Raina |
| 6,161,188 A | 12/2000 | Gaskins et al. |
| 6,298,370 B1 | 10/2001 | Tang et al. |
| 6,728,892 B1 | 4/2004 | Silvkoff et al. |
| 6,804,632 B2 | 10/2004 | Orenstien et al. |
| 6,907,548 B2 | 6/2005 | Abdo |
| 7,032,119 B2 | 4/2006 | Fung |
| 7,197,652 B2 | 3/2007 | Keller, Jr. et al. |

(Continued)

FOREIGN PATENT DOCUMENTS

| JP | 2004252900 | 9/2004 |
| JP | 2004252900 A | 9/2004 |

(Continued)

OTHER PUBLICATIONS

International Search Report and Written Opinion Received for PCT Patent Application No. PCT/US2011/053177, Korea Intellectual Property Office. Published Apr. 24, 2012. 10 pages.

(Continued)

*Primary Examiner* — Abdullah Al Kawsar
(74) *Attorney, Agent, or Firm* — Mnemoglyphics, LLC; Lawrence M. Mennemeier

(57) ABSTRACT

Methods and apparatus to schedule applications in heterogeneous multiprocessor computing platforms are described. In one embodiment, information regarding performance (e.g., execution performance and/or power consumption performance) of a plurality of processor cores of a processor is stored (and tracked) in counters and/or tables. Logic in the processor determines which processor core should execute an application based on the stored information. Other embodiments are also claimed and disclosed.

30 Claims, 5 Drawing Sheets

(56) References Cited

U.S. PATENT DOCUMENTS

| | | | |
|---|---|---|---|
| 7,254,812 B1* | 8/2007 | Menezes | 718/102 |
| 7,412,353 B2 | 8/2008 | Borkar et al. | |
| 7,560,945 B2 | 7/2009 | Singh | |
| 7,587,716 B2 | 9/2009 | Yoshimura | |
| 7,596,430 B2 | 9/2009 | Aguilar et al. | |
| 7,714,635 B2 | 5/2010 | Singh et al. | |
| 7,770,176 B2 | 8/2010 | Maeda et al. | |
| 7,779,235 B2 | 8/2010 | Singh et al. | |
| 7,865,750 B2 | 1/2011 | Singh et al. | |
| 7,895,454 B2 | 2/2011 | Singh | |
| 7,917,905 B2 | 3/2011 | Itoh | |
| 7,936,153 B2 | 5/2011 | Singh et al. | |
| 7,954,101 B2 | 5/2011 | Adachi et al. | |
| 7,971,035 B2 | 6/2011 | Singh et al. | |
| 8,005,880 B2 | 8/2011 | Singh et al. | |
| 8,022,685 B2 | 9/2011 | Singh et al. | |
| 8,161,304 B2 | 4/2012 | Hamilton | |
| 8,161,482 B1* | 4/2012 | Sakarda | 718/102 |
| 8,185,572 B2 | 5/2012 | Singh | |
| 2002/0018486 A1 | 2/2002 | Musoll et al. | |
| 2002/0112097 A1 | 8/2002 | Milovanovic et al. | |
| 2003/0070013 A1 | 4/2003 | Hansson | |
| 2004/0006729 A1 | 1/2004 | Pendurkar | |
| 2004/0158747 A1 | 8/2004 | Kim | |
| 2004/0193778 A1 | 9/2004 | Ishikawa et al. | |
| 2004/0199730 A1 | 10/2004 | Eggers et al. | |
| 2004/0215987 A1 | 10/2004 | Farkas et al. | |
| 2005/0154931 A1 | 7/2005 | Oh | |
| 2005/0172289 A1 | 8/2005 | Klingman | |
| 2005/0204346 A1* | 9/2005 | Davies | 717/127 |
| 2006/0090161 A1* | 4/2006 | Bodas et al. | 718/100 |
| 2006/0168571 A1* | 7/2006 | Ghiasi et al. | 717/127 |
| 2006/0212677 A1 | 9/2006 | Fossum | |
| 2007/0067606 A1* | 3/2007 | Lin et al. | 712/10 |
| 2007/0198981 A1 | 8/2007 | Jacobs et al. | |
| 2007/0220294 A1 | 9/2007 | Lippett | |
| 2007/0220517 A1 | 9/2007 | Lippett | |
| 2007/0282572 A1 | 12/2007 | Larus | |
| 2007/0294693 A1 | 12/2007 | Barham | |
| 2008/0005539 A1 | 1/2008 | Velhal et al. | |
| 2008/0082285 A1 | 4/2008 | Samaan et al. | |
| 2008/0120485 A1 | 5/2008 | Rothman et al. | |
| 2008/0163254 A1* | 7/2008 | Cota-Robles et al. | 719/318 |
| 2008/0189516 A1 | 8/2008 | Singh et al. | |
| 2008/0189520 A1* | 8/2008 | Singh et al. | 712/214 |
| 2008/0301474 A1 | 12/2008 | Bussa et al. | |
| 2009/0055122 A1* | 2/2009 | Singh et al. | 702/110 |
| 2009/0055580 A1 | 2/2009 | Moscibroda et al. | |
| 2009/0055826 A1* | 2/2009 | Bernstein et al. | 718/102 |
| 2009/0217286 A1 | 8/2009 | Schmidbauer et al. | |
| 2009/0288092 A1* | 11/2009 | Yamaoka | 718/104 |
| 2009/0313490 A1 | 12/2009 | Tani | |
| 2009/0328058 A1* | 12/2009 | Papaefstathiou et al. | 718/107 |
| 2010/0250792 A1 | 9/2010 | Harriman et al. | |
| 2010/0251160 A1* | 9/2010 | Shafi et al. | 715/772 |
| 2010/0299541 A1* | 11/2010 | Ishikawa et al. | 713/300 |
| 2011/0023047 A1* | 1/2011 | Memik et al. | 718/104 |

FOREIGN PATENT DOCUMENTS

| | | |
|---|---|---|
| JP | 2008090546 | 4/2008 |
| JP | 2008090546 A | 4/2008 |
| TW | 200638267 | 11/2006 |
| TW | 200703116 | 1/2007 |

OTHER PUBLICATIONS

A. Malik, Y. Zhang, G. Memik, "Automated Task Distribution in Multicore Network Processors Using Statistical Analysis," Proceedings of International Symposium on Architectures for Networking and Communication Systems (ANCS). Orlando, FL, Dec. 2007, pp. 67-76.

R. Teodorescu, J. Torrellas, "Variation-Aware Application Scheduling and Power Management for Chip Multiprocessors," 35th Annual International Symposium on Computer Architecture (ISCA), Jun. 2008, 12 pages.

F. A. Bower, D. J. Sorin, L. P. Cox, "The Impact of Dynaically Heterogeneous Multicore Processors on Thread Scheduling," IEEE Micro 28, 3; May 2008, pp. 17-25.

J. H. Anderson, J. M. Calandrino, U. C. Devi, "Real-Time Scheduling on Multicore Platforms," Proceedings of the Realtime and Embedded Technology and Applications Symposium, Apr. 2006, 12 pages.

S. Siddha, V. Pallipadi, A. Mallick, Process Scheduing Challenges in the Ero of Multi-core Processors, Intel Technology Journal, Nov. 2007, pp. 361-370.

M. Rajagopalan, B. T. Lewis, T. A. Anderson, "Thread Scheduling for Multi-core Platforms," Proceedings of the Usenix Workshop on Hot Topics in Operating Systems, San Diego CA, May 2007, 9 pages.

* cited by examiner

APPLICATION SCHEDULING IN HETEROGENEOUS MULTIPROCESSOR COMPUTING PLATFORM BASED ON A RATIO OF PREDICTED PERFORMANCE OF PROCESSOR CORES

FIELD

The present disclosure generally relates to the field of electronics. More particularly, an embodiment of the invention relates to techniques for scheduling applications in heterogeneous multiprocessor computing platforms.

BACKGROUND

To improve performance, some computing systems include multiple processors. However, scaling of multi-processor computing systems is restricted by power constraints. Namely, as more processors are added to a system, power consumption increases. Also, the additional power consumption generates more heat. Hence, heat and power requirements may restrict scaling of multi-processor computing systems.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof. Also, the use of "instruction" and "micro-operation" (uop) is interchangeable as discussed herein.

As Chip-MultiProcessor (CMP) systems become popular, e.g., for server and client platforms, heterogeneous CMP starts to gain momentum. For example, smaller processor cores may provide better performance/watt advantage. So adding smaller processor cores along with bigger processor cores can be attractive. As discussed herein, heterogeneous CMP contains a set of cores that are different in performance, area, and/or power dissipation. Such a platform provides opportunities to allow better mapping of compute resources to various application so that both performance and power efficiency may be achieved in some embodiments.

However, one of the key challenges in heterogeneous CMP platform design is application scheduling, i.e., mapping applications to the plurality of processor cores that optimizes performance and/or power efficiency. To this end, one embodiment relates to dynamically scheduling applications among heterogeneous cores (e.g., on a single integrated circuit (IC) chip/die). In one embodiment, two components may be used to schedule applications. First, a processor core modeling predication heuristics may be provided. Second, a scheduling logic may be used to schedule applications for heterogeneous processor cores based on the core modeling predication heuristics.

Figure 1:
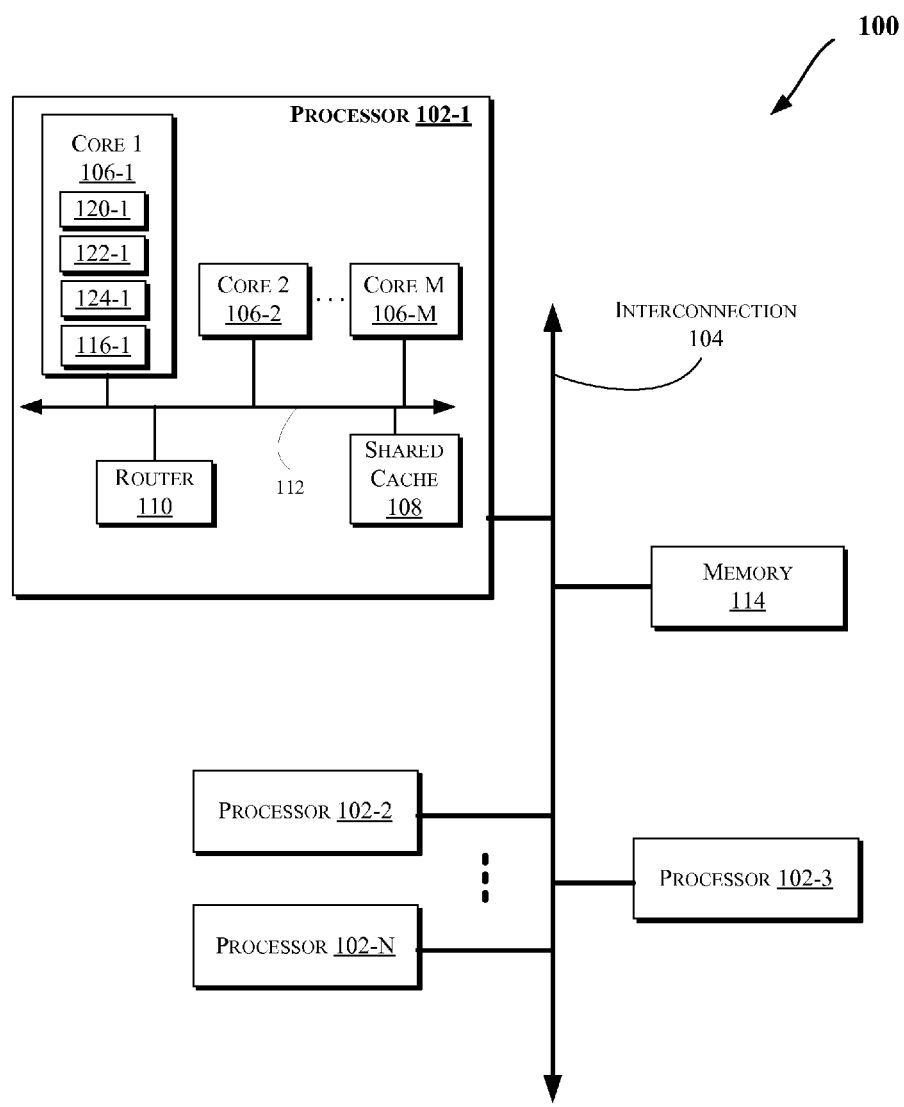
FIGS. 1, 5, and 6 illustrate block diagrams of embodiments of computing systems, which may be utilized to implement various embodiments discussed herein.

The techniques discussed herein may be used in any type of a processor with performance state settings, such as the processors discussed with reference to FIGS. 1 and 5-6. More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection network or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106" or more generally as "core 106"), a shared cache 108, and/or a router 110. The processor cores 106 may be implemented on a single integrated circuit (IC) chip. Moreover, the chip may include one or more shared and/or private caches (such as cache 108), buses or interconnections (such as a bus or interconnection network 112), memory controllers (such as those discussed with reference to FIGS. 5 and 6), or other components. Also, the cores 106 may be heterogeneous (e.g., having different sizes, performance characteristics, power consumption characteristics, etc. as discussed herein).

In one embodiment, the router 110 may be used to communicate between various components of the processor 102-1 and/or system 100. Moreover, the processor 102-1 may include more than one router 110. Furthermore, the multitude of routers (110) may be in communication to enable data routing between various components inside or outside of the processor 102-1.

The shared cache 108 may store data (e.g., including instructions) that are utilized by one or more components of the processor 102-1, such as the cores 106. For example, the shared cache 108 may locally cache data stored in a memory 114 for faster access by components of the processor 102. In an embodiment, the cache 108 may include a mid-level cache (such as a level 2 (L2), a level 3 (L3), a level 4 (L4), or other levels of cache), a last level cache (LLC), and/or combinations thereof. Moreover, various components of the processor 102-1 may communicate with the shared cache 108 directly, through a bus (e.g., the bus 112), and/or a memory controller or hub. As shown in FIG. 1, in some embodiments, one or more of the cores 106 may include a level 1 (L1) and/or level 2 (L2) cache (116-1) (generally referred to herein as "L1/L2 cache 116"). The L1 and/or L2 cache 116 may be private or shared in various embodiments.

In one embodiment, as will be further discussed below with reference to FIGS. 2-4, each of the cores may include a logic 120 to assist in assigning applications to various processor cores in the system. For example, the applications may be assigned (e.g., by an Operating System (OS)) based on information stored in counter(s) 122 (such as performance counter(s) that indicate the performance of one or more other cores in the system). The applications may also be assigned (e.g., by the OS) based on a process identifier (ID) which may be used to index into a table (such as a performance history table (PHT) 124-1). The table may be stored in shared memory (such as memory 114 and/or shared cache 108) or a dedicated storage device in the processor 102 or core 106 (e.g., PHT 124-1), such a private cache (e.g., L1/L2 cache 116). The table may provide information/hints to the Operating System (OS) when scheduling applications, as will be further discussed below with reference to FIGS. 2-4, for example. In some embodiments, the OS and application may be stored in memory 114 (or memories 512 of FIG. 5 and 610/612 of FIG. 6).

Figure 2:
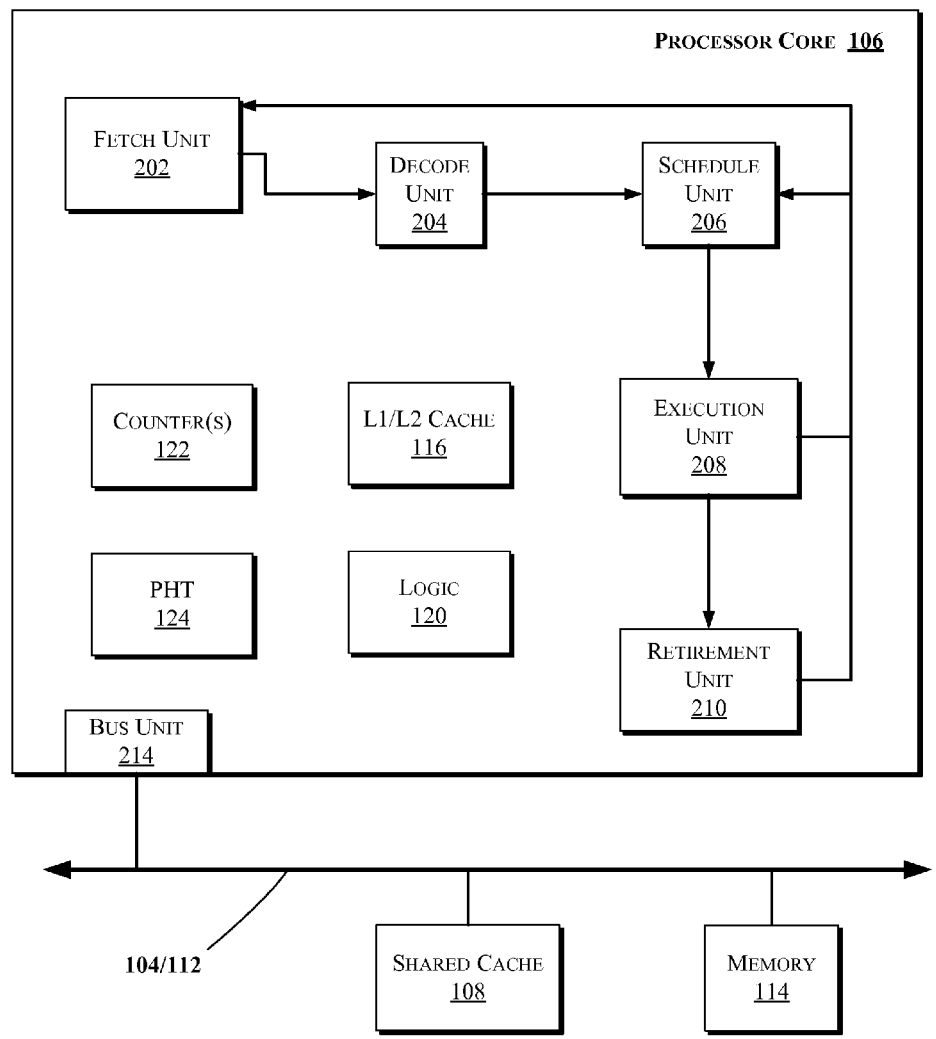
FIG. 2 illustrates a block diagram of portions of a processor core and other components of a computing system, according to an embodiment.

FIG. 2 illustrates a block diagram of portions of a processor core 106 and other components of a computing system, according to an embodiment of the invention. In one embodiment, the arrows shown in FIG. 2 illustrate the flow direction of instructions through the core 106. One or more processor cores (such as the processor core 106) may be implemented on a single integrated circuit chip (or die) such as discussed with reference to FIG. 1. Moreover, the chip may include one or more shared and/or private caches (e.g., caches 106 and 108 of FIG. 1), interconnections (e.g., interconnections 104 and/or 112 of FIG. 1), logic 120, counter(s) 122, memory controllers, or other components.

As illustrated in FIG. 2, the processor core 106 may include a fetch unit 202 to fetch instructions (including instructions with conditional branches) for execution by the core 106. The instructions may be fetched from any storage devices such as the memory 114 and/or the memory devices discussed with reference to FIGS. 4 and 5. The core 106 may also include a decode unit 204 to decode the fetched instruction. For instance, the decode unit 204 may decode the fetched instruction into a plurality of uops (micro-operations). Additionally, the core 106 may include a schedule unit 206. The schedule unit 206 may perform various operations associated with storing decoded instructions (e.g., received from the decode unit 204) until the instructions are ready for dispatch, e.g., until all source values of a decoded instruction become available. In one embodiment, the schedule unit 206 may schedule and/or issue (or dispatch) decoded instructions to an execution unit 208 for execution. The execution unit 208 may execute the dispatched instructions after they are decoded (e.g., by the decode unit 204) and dispatched (e.g., by the schedule unit 206). In an embodiment, the execution unit 208 may include more than one execution unit. The execution unit 208 may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit 208.

Further, the execution unit 208 may execute instructions out-of-order. Hence, the processor core 106 may be an out-of-order processor core in one embodiment. The core 106 may also include a retirement unit 210. The retirement unit 210 may retire executed instructions after they are committed. In an embodiment, retirement of the executed instructions may result in processor state being committed from the execution of the instructions, physical registers used by the instructions being de-allocated, etc.

The core 106 may also include a bus unit 214 to enable communication between components of the processor core 106 and other components (such as the components discussed with reference to FIG. 1) via one or more buses (e.g., buses 104 and/or 112). The core 106 may also include one or more counters 122 to store data accessed by various components of the core 106, including the logic 120, as discussed with reference to FIGS. 1 and 3-4).

Moreover, in some embodiments, the logic 120 not only keeps track of performance of an application, but also predicts the application's execution and/or power consumption performance if it were to execute on another core in the system (e.g., based on the values stores in the counters 122). This information may be provided to OS which may perform scheduling based on various thresholds such as power, performance, energy, combinations thereof, etc. For example, the OS and/or logic 120 may compare the various execution or power consumption performance data of the processor cores being considered and make a determination regarding which core would provide the better execution or power consumption performance (based on various thresholds discussed herein).

In accordance with an embodiment, a signature based approach may be used. For example, each application may be executed on one or more cores in the system and the application performance statistics may be stored in the PHT a performance history table (PHT). Performance statistics may include CPI (Cycles Per Instruction), MPI (Misses Per Instruction), etc. For example, as shown in sample Table 1, each table entry may have three or more fields. The first one indicates the process ID, second is for storing the CPI of the application while executing on big core and, the last one stores the performance of the application while executing on a small core. Whenever the application is context switched to the other core, logic 120 may obtain new information and update the PHT 124.

TABLE 1

Sample Performance History Table (PHT)

| Process ID | Big Core CPI | Small Core CPI |
|---|---|---|
| 1011 | 0.98 | 1.35 |
| 1012 | 0.73 | 1.44 |
| 2013 | 1.19 | 1.31 |

The size of the PHT 124 may be quite small. For instance, if only CPI is used, 12 bytes per entry is the memory needed to store the history information. The PHT 124 may also be stored in the Process Control Block (PCB) of the application and/or may be loaded into another memory (e.g., PHT 124, cache 106, memory 114, cache 108, etc.) whenever the application is scheduled to run. This methodology may be extended beyond a process and may be used for various hotspots within a process.

Figures 3, 4:
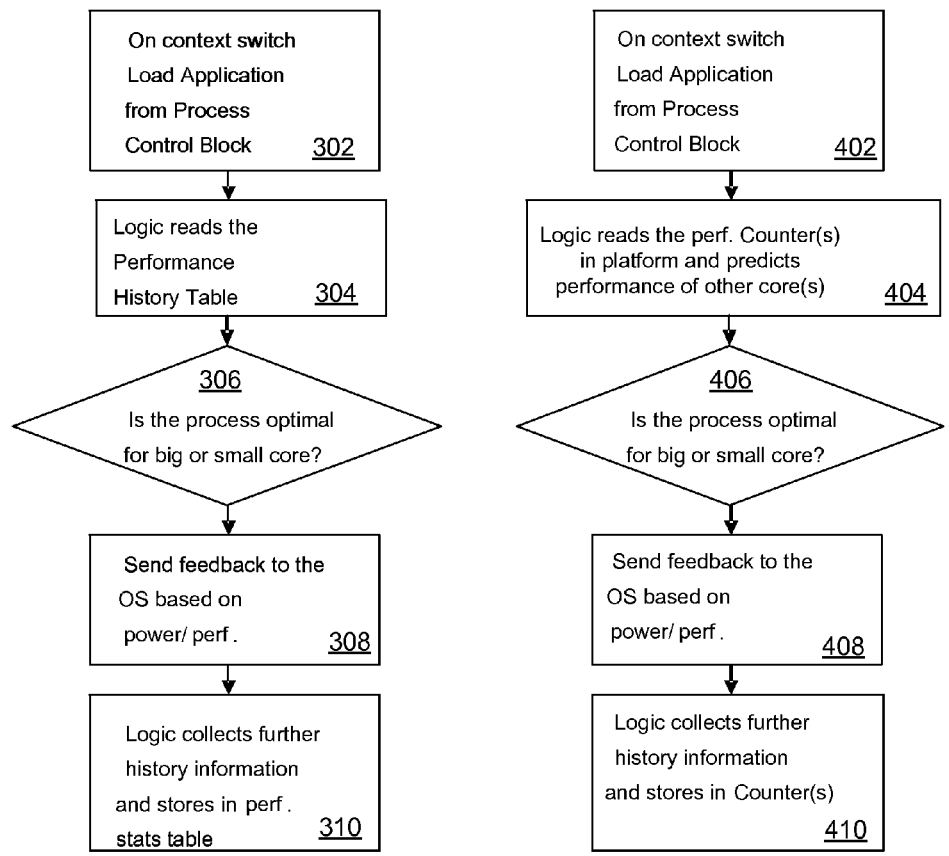
FIGS. 3-4 illustrate flow diagrams in accordance with some embodiments.

Once the PHT is setup, every time the application is scheduled to run, the logic 120 reads the information from PHT and provides hints to OS for optimal scheduling policies based on predefined metrics (such as power/performance, etc), as shown in FIG. 3.

Referring to FIG. 3, a flow diagram for a signature-based core modeling prediction heuristics approach is illustrated, according to an embodiment. In some embodiments, various components discussed with reference to FIGS. 1-2 and 5-6 may be utilized to perform one or more of the operations discussed with reference to FIG. 3.

Referring to FIGS. 1-3, at an operation 302, on a context switch, the application is loaded (e.g., from a process control block or another location as discussed herein). At an operation 304, logic 120 reads the information from PHT. At operation 306, it is determined based on the PHT information whether the process is optimal (e.g., for performance or power consumption purposes) for a big or a small processor core. This information is then sent to the OS at operation 308 (in an embodiment based on power consumption and/or performance considerations as determined by the logic 120 for example). At an operation 310, logic 120 collects further history information (e.g., based on the latest determination at operation 306) and updates the PHT information.

Referring to FIG. 4, a flow diagram for a performance-based core modeling prediction heuristics approach is illustrated, according to an embodiment. In some embodiments, various components discussed with reference to FIGS. 1-2 and 5-6 may be utilized to perform one or more of the operations discussed with reference to FIG. 4.

Referring to FIGS. 1-2 and 4, at an operation 402, on a context switch, the application is loaded (e.g., from a process control block or another location as discussed herein). At an operation 404, logic 120 reads the values stored in the performance counters (e.g., counters 122). At operation 406, it is determined based on the performance counter information whether the process is optimal (e.g., for performance or power consumption purposes) for a big or a small processor core. This information is then sent to the OS at operation 408 (in an embodiment based on power consumption and/or performance considerations as determined by the logic 120 for example). At an operation 410, logic 120 collects further history information (e.g., based on the latest determination at operation 406) and updates the performance counter (e.g., counters 122).

In a performance counter based approach, in accordance with some embodiments, a dynamic model may be used which may effectively predict the performance of an application on a small core while it is executing on a big core and vice-versa. This approach uses the performance counters (e.g., counters 122) and predicts performance based on the following equation:

Cycles in Small core=((Cycles in Big core−stall cycles on big core)*Issue width of small core/Issue width of big core*Multiplication factor)+($L1$ Miss in big core*$L1$ miss penalty of small core)+($L2$ Miss in big core*$L2$ miss penalty of small core)

In an embodiment, the multiplication factor may be derived empirically based on L2 misses and number of load/store instructions. In some embodiments, the big core may have twice the number of load/store units as compared to small core. Further, in some implementations, significant L2 miss applications may not benefit by the out-of-order nature of a big core due to lack of memory level parallelism observed in some workloads.

Cycles in Big core=((Cycles in Small core−stall cycles on small core)*Issue width of Big core/Issue width of Small core)/(1−stall factor)

Stall factor may be derived by running the applications once on the big core and collecting the stall cycles and total cycles performance data. Also, some platforms may include various performance counters to identify stalls due to long latency operations such as cache miss, floating point stalls, etc. These stalls combined with other counters such as load/store instructions retired, L2 misses, etc., when used in logic 120, may help predict the performance of the application if it were to run on another core. Even if there is no specific memory stall counter in the platforms, the stalls may be estimated using other stall counters in the platform.

With respect to scheduling, some embodiments may map various applications to big and small cores based on the performance information provided by logic 120 as follows: (1) For a single application, if the performance ratio of big to small core is greater than a programmable value, then schedule the application on the big core; otherwise schedule it on the small core. This programmable value may reside in the core and may be written using MSR's (Machine State Register) based on various power/performance metrics; (2) For multiple applications, with N applications that need to be scheduled for example, order applications based on their Performance ratio of big to small core. The top N/2 apps (e.g., apps with maximal performance gains) are scheduled onto the big core, and the bottom N/2 apps (e.g., apps with the smaller performance ratios of big core to small core) are scheduled on the small core.

In some embodiments, one or more of the following counters may be used (e.g., for counters 122):
  (1) Core clock cycles: this counter counts the number of cycles in which the core was active executing instructions;
  (2) Instructions retired: this counter counts the number of instructions the core retired during the given time sample;
  (3) L2 Misses: this counter counts the number of memory references that missed the L2;
  (4) Scheduler stalls: this counter counts the number of cycles in which the small core could not schedule instructions (this count can also be derived based on the product of L2 misses and L2 miss latency in the small core);
  (5) Resource stalls: this counter counts the number of cycles the big core stalled due to unavailability of resources such as reservation stations, long latency misses, etc.; and/or
  (6) Branch stalls: this counter counts the total number of cycles lost due to branch mispredictions.

Figure 5:
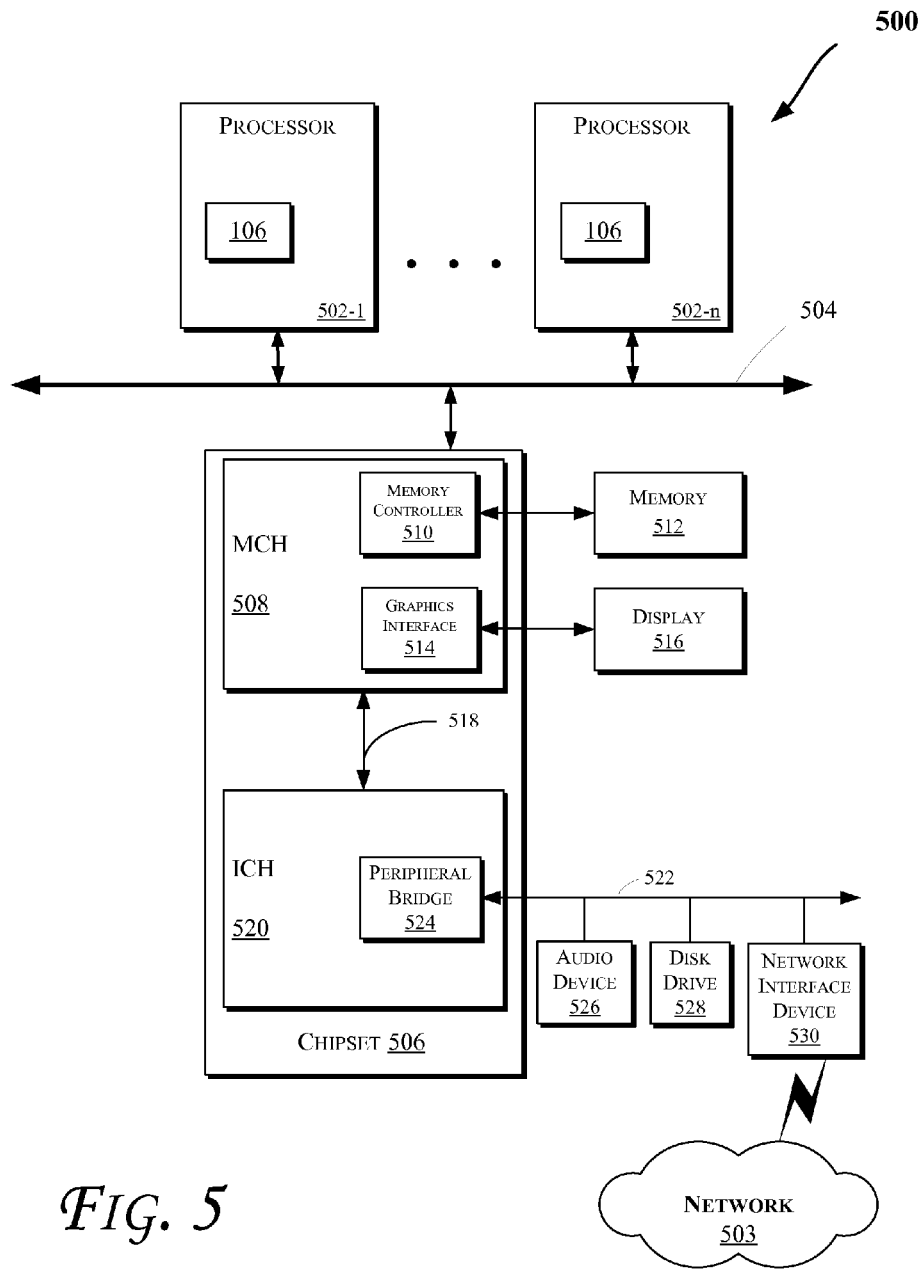

FIG. 5 illustrates a block diagram of a computing system 500 in accordance with an embodiment of the invention. The computing system 500 may include one or more central processing unit(s) (CPUs) 502 or processors that communicate via an interconnection network (or bus) 504. The processors 502 may include a general purpose processor, a network processor (that processes data communicated over a computer network 503), or other types of a processor (including a reduced instruction set computer (RISC) processor or a complex instruction set computer (CISC)). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors. In an embodiment, one or more of the processors 502 may be the same or similar to the processors 102 of FIG. 1. For example, one or more of the processors 502 may include the cores 106 discussed with reference to FIGS. 1-4. Also, the operations discussed with reference to FIGS. 1-4 may be performed by one or more components of the system 500.

A chipset 506 may also communicate with the interconnection network 504. The chipset 506 may include a memory control hub (MCH) 508. The MCH 508 may include a memory controller 510 that communicates with a memory 512 (which may be the same or similar to the memory 114 of FIG. 1). The memory 512 may store data, including sequences of instructions that may be executed by the CPU 502, or any other device included in the computing system 500. In one embodiment of the invention, the memory 512 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 504, such as multiple CPUs and/or multiple system memories.

The MCH 508 may also include a graphics interface 514 that communicates with a display device 516. In one embodiment of the invention, the graphics interface 514 may communicate with the display device 516 via an accelerated graphics port (AGP). In an embodiment of the invention, the display 516 (such as a flat panel display) may communicate with the graphics interface 514 through, for example, a signal converter that translates a digital representation of an image stored in a storage device such as video memory or system memory into display signals that are interpreted and displayed by the display 516. The display signals produced by the display device may pass through various control devices before being interpreted by and subsequently displayed on the display 516.

A hub interface 518 may allow the MCH 508 and an input/output control hub (ICH) 520 to communicate. The ICH 520 may provide an interface to I/O device(s) that communicate with the computing system 500. The ICH 520 may communicate with a bus 522 through a peripheral bridge (or controller) 524, such as a peripheral component interconnect (PCI) bridge, a universal serial bus (USB) controller, or other types of peripheral bridges or controllers. The bridge 524 may provide a data path between the CPU 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 522 may communicate with an audio device 526, one or more disk drive(s) 528, and a network interface device 530 (which is in communication with the computer network 503). Other devices may communicate via the bus 522. Also, various components (such as the network interface device 530) may communicate with the MCH 508 in some embodiments of the invention. In addition, the processor 502 and the MCH 508 may be combined to form a single chip. Furthermore, the graphics accelerator 516 may be included within the MCH 508 in other embodiments of the invention.

Furthermore, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 6:
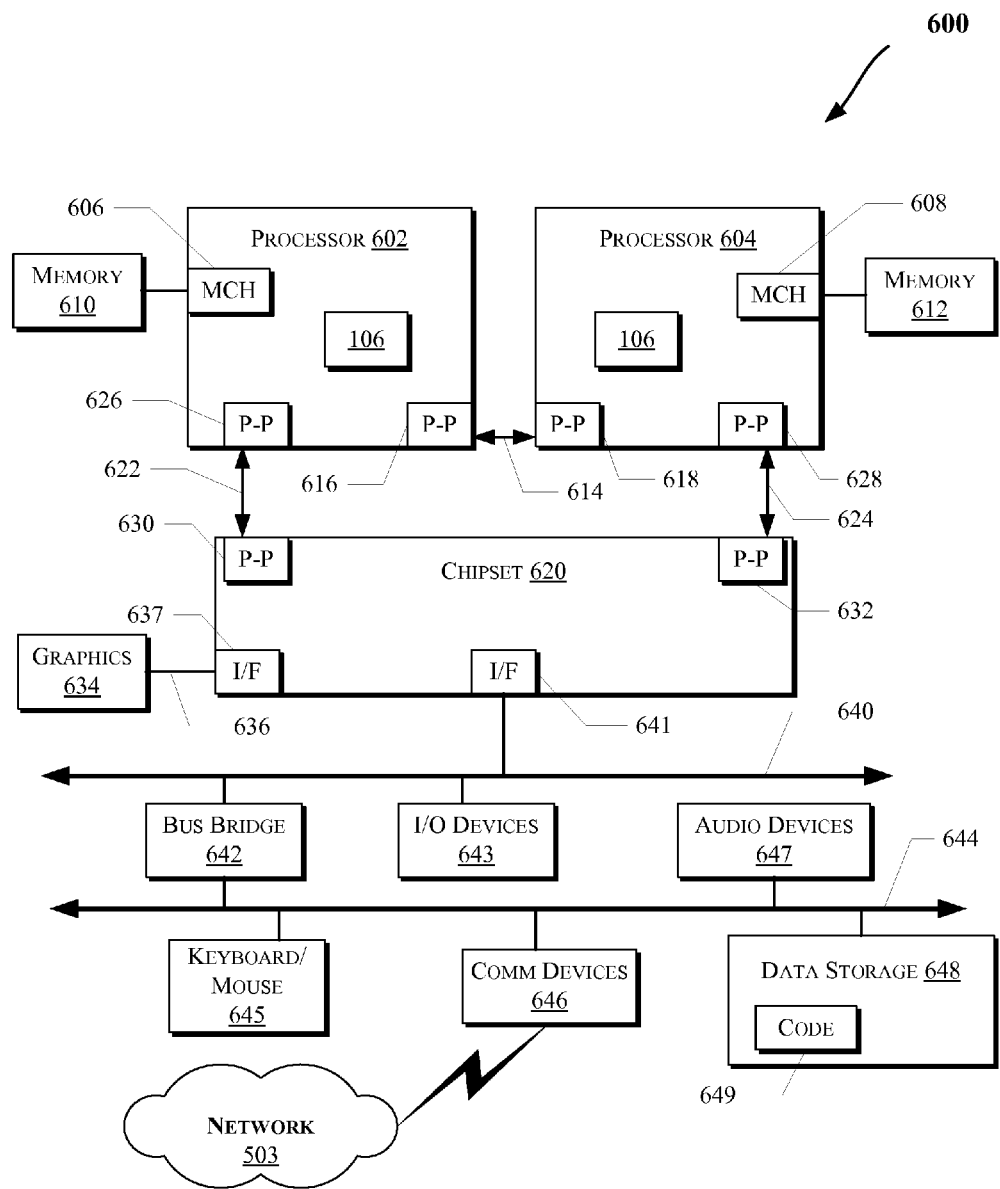

FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local memory controller hub (MCH) 606 and 608 to enable communication with memories 610 and 612. The memories 610 and/or 612 may store various data such as those discussed with reference to the memory 512 of FIG. 5.

In an embodiment, the processors 602 and 604 may be one of the processors 502 discussed with reference to FIG. 5. The processors 602 and 604 may exchange data via a point-to-point (PtP) interface 614 using PtP interface circuits 616 and 618, respectively. Also, the processors 602 and 604 may each exchange data with a chipset 620 via individual PtP interfaces 622 and 624 using point-to-point interface circuits 626, 628, 630, and 632. The chipset 620 may further exchange data with a graphics circuit 634 via a graphics interface 636, e.g., using a PtP interface circuit 637.

At least one embodiment of the invention may be provided within the processors 602 and 604. For example, the cores 106 of FIGS. 1-5 may be located within the processors 602 and 604. Other embodiments of the invention, however, may exist in other circuits, logic units, or devices within the system 600 of FIG. 6. Furthermore, other embodiments of the invention may be distributed throughout several circuits, logic units, or devices illustrated in FIG. 6.

The chipset 620 may communicate with a bus 640 using a PtP interface circuit 641. The bus 640 may communicate with one or more devices, such as a bus bridge 642 and I/O devices 643. Via a bus 644, the bus bridge 642 may communicate with other devices such as a keyboard/mouse 645, communication devices 646 (such as modems, network interface devices, or other communication devices that may communicate with the computer network 503), audio I/O device 647, and/or a data storage device 648. The data storage device 648 may store code 649 that may be executed by the processors 602 and/or 604.

In various embodiments of the invention, the operations discussed herein, e.g., with reference to FIGS. 1-6, may be implemented as hardware (e.g., logic circuitry), software, firmware, or combinations thereof, which may be provided as a computer program product, e.g., including (e.g., a non-transitory) machine-readable or computer-readable medium having stored thereon instructions (or software procedures) used to program a computer to perform a process discussed herein. The machine-readable medium may include a storage device such as those discussed with respect to FIGS. 1-6.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection).

Reference in the specification to "one embodiment," "an embodiment," or "some embodiments" means that a particular feature, structure, or characteristic described in connection with the embodiment(s) may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A processor with application scheduling using performance-based core modeling prediction heuristics comprising:
   a storage unit to store a performance history table (PHT), said PHT including performance statistics, and one or more performance counters, said performance counters corresponding to performance of an application having been executed on one or more of a plurality of heterogeneous processor cores of the processor; and
   logic to determine whether a first processor core of the plurality of processor cores is to execute the application based, at least in part, on a ratio of predicted performance of the application if it were executed on the first processor core versus on another processor core of the plurality of processor cores, the performance to be predicted for the first processor core from the one or more performance counters of said another processor core, and to cause scheduling of the application for execution on the first processor core whenever said ratio of predicted performance on the first processor core versus said another processor core indicates either one of the larger performance gains or one the smaller performance losses, wherein said ratio of predicted performance is predicted from an issue width ratio on the first processor core versus said another processor core as diminished by one or more predicted stall factor ratios, and
   wherein the logic is to transmit data to an operating system to cause scheduling of the application on the first processor core.

2. The processor of claim 1, wherein the logic is to transmit data to the operating system to cause scheduling of the application on the first processor core in response to detection of a context switch.

3. The processor of claim 1, wherein the stored PHT corresponding to the performance of the application having been executed on one or more of the plurality of processor cores of the processor is to comprise execution performance data or power consumption performance data.

4. The processor of claim 1, wherein the logic is to update the stored PHT based on collected information.

5. The processor of claim 1, wherein the logic is to predict execution performance or power consumption performance of the application on at least some of the plurality of processor cores.

6. The processor of claim 1, wherein the application is scheduled for execution on the first processor core whenever said ratio of predicted performance on the first processor core versus said another processor core indicates either one of the larger performance gains or one the smaller performance losses in comparison to all applications available to be scheduled.

7. The processor of claim 1, wherein the storage unit is to comprise: a shared memory, a private cache, a shared cache, or a dedicated memory.

8. The processor of claim 1, wherein the stored PHT is stored in a process control block of the application.

9. The processor of claim 1, wherein the storage unit is to store a performance history table (PHT) including performance statistics for each application executing on one or more of the plurality of processor cores.

10. The processor of claim 9, wherein each entry in the PHT is to at least store a process identifier and a plurality cycles per instruction corresponding to the plurality of processor cores.

11. The processor of claim 1, wherein the storage unit is to store one or more performance counters for each application executing on one or more of the plurality of processor cores.

12. The processor of claim 11, wherein the one or more performance counters are to comprise: core clock cycles, instructions retired, level 2 cache misses, scheduler stalls, resource stalls, or branch stalls.

13. A method comprising:
   storing a performance history table (PHT), said PHT including performance statistics, and one or more performance counters, said performance counters corresponding to performance of an application having been executed on one or more of a plurality of heterogeneous processor cores of a processor;
   determining whether a first processor core of the plurality of processor cores is to execute an application based, at least in part, on a ratio of predicted performance of the application if it were executed on the first processor core versus on another processor core of the plurality of processor cores, the performance to be predicted for the first processor core from the one or more performance counters of said another processor core; and
   scheduling the application for execution on the first processor core in response to a transmission of data corresponding to the first processor core to an operating system whenever said ratio of predicted performance on the first processor core versus said another processor core indicates either one of the larger performance gains or one the smaller performance losses, wherein said ratio of predicted performance is predicted from an issue width ratio on the first processor core versus said another processor core as diminished by one or more predicted stall factor ratios.

14. The method of claim 13, wherein the transmission of data is to be in response to detection of a context switch.

15. The method of claim 13, wherein the stored PHT corresponding to the performance of the application having been executed on one or more of the plurality of processor cores of the processor is to comprise execution performance data or power consumption performance data.

16. The method of claim 13, further comprising updating the stored PHT based on collected information.

17. The method of claim 13, further comprising predicting execution performance or power consumption performance of the application on at least some of the plurality of processor cores.

18. The method of claim 13, wherein storing the PHT is in a process control block of the application.

19. The method of claim 13, wherein
   each entry in the PHT is to at least store a process identifier and a plurality cycles per instruction corresponding to the plurality of processor cores; or one or more performance counters, wherein the one or more performance counters are to comprise: core clock cycles, instructions retired, level 2 cache misses, scheduler stalls, resource stalls, or branch stalls.

20. A computing system comprising:
- a processor comprising a plurality of heterogeneous processor cores; and
- a storage unit to store a performance history table (PHT), said PHT including performance statistics, and one or more performance counters, said performance counters corresponding to performance of an application having been executed on one or more of the plurality of processor cores of the processor, wherein at least one of the plurality of processor cores is to comprise logic to determine whether a first processor core of the plurality of processor cores is to execute an application based, at least in part, on a ratio of predicted performance of the application if it were executed on the first processor core versus on another processor core of the plurality of processor cores, the performance to be predicted for the first processor core from the one or more performance counters of said another processor core, and to cause scheduling of the application for execution on the first processor core whenever said ratio of predicted performance on the first processor core versus said another processor core indicates either one of the larger performance gains or one the smaller performance losses, wherein said ratio of predicted performance is predicted from an issue width ratio on the first processor core versus said another processor core as diminished by one or more predicted stall factor ratios, and
- wherein the logic is to transmit data to an operating system to cause scheduling of the application on the first processor core in response to detection of a context switch.

21. The system of claim 20, wherein the stored PHT corresponding to the performance of the application having been executed on one or more of the plurality of processor cores of the processor is to comprise execution performance data or power consumption performance data.

22. The system of claim 20, wherein the logic is to predict execution performance or power consumption performance of the application on at least some of the plurality of processor cores.

23. The system of claim 20, wherein the application is scheduled for execution on the first processor core whenever said ratio of predicted performance on the first processor core versus said another processor core indicates either one of the larger performance gains or one the smaller performance losses in comparison to all applications available to be scheduled.

24. The system of claim 20, wherein each entry in the PHT is to at least store a process identifier and a plurality cycles per instruction corresponding to the plurality of processor cores.

25. The system of claim 20, wherein the one or more performance counters are to comprise: core clock cycles, instructions retired, level 2 cache misses, scheduler stalls, resource stalls, or branch stalls.

26. The system of claim 20, further comprising an audio device coupled to the processor core.

27. A non-transitory computer-readable medium to store instructions that when executed by a processor cause the process to:
- store a performance history table (PHT), said PHT including performance statistics, and one or more performance counters, said performance counters corresponding to performance of an application having been executed on one or more of a plurality of heterogeneous processor cores of a processor;
- determine whether a first processor core of the plurality of heterogeneous processor cores is to execute an application based, at least in part, on a ratio of predicted performance of the application if it were executed on the first processor core versus on another processor core of the plurality of heterogeneous processor cores, the performance to be predicted for the first processor core from the one or more performance counters of said another processor core; and
- whenever said ratio of predicted performance on the first processor core versus another heterogeneous processor core indicates either one of the larger performance gains or one the smaller performance losses, schedule the application for execution on the first processor core in response to a transmission of data corresponding to the first processor core to an operating system, wherein said ratio of predicted performance is predicted from an issue width ratio on the first processor core versus said another processor core as diminished by one or more predicted stall factor ratios.

28. The non-transitory computer-readable medium of claim 27, wherein the instructions are to cause the processor to cause the transmission of data in response to detection of a context switch.

29. The non-transitory computer-readable medium of claim 27, wherein the stored PHT corresponding to the performance of the application having been executed on one or more of the plurality of processor cores of the processor is to comprise execution performance data or power consumption performance data.

30. The non-transitory computer-readable medium of claim 27, wherein the instructions are to cause the processor to predict execution performance or power consumption performance of the application on at least some of the plurality of processor cores.

* * * * *